UNITED STATES PATENT OFFICE.

CHARLES LOWE AND JOHN GILL, OF MANCHESTER, ENGLAND.

IMPROVEMENT IN PROCESSES FOR SEPARATING MIXED COAL-TAR PRODUCTS.

Specification forming part of Letters Patent No. 173,862, dated February 22, 1876; application filed August 14, 1875.

*To all whom it may concern:*

Be it known that we, CHARLES LOWE and JOHN GILL, both of Manchester, in the county of Lancaster, England, manufacturing chemists, have invented certain new and useful Improvements in the Manufacture and Separation of Certain Mixed Coal-Tar Products; and we hereby declare the following to be a full, clear, and exact description thereof—that is to say:

The object of this invention is to effect and facilitate the separation of carbolic acid from the cresylic and other liquid tar-acids contained in the varying mixtures of these products met with in the market and manufactory, which mixtures, when dehydrated by distillation in the usual manner, are capable of crystallization at temperatures between 62° and 95° Fahrenheit.

The nature of this invention is, first, to submit the partially or wholly hydrated mixtures of tar-acids above mentioned to the sufficiently prolonged action of temperatures varying between 15° Fahrenheit and 56° Fahrenheit; secondly, to separate by suitable means the more or less hydrated carbolic-acid crystals thus formed from the mother-liquors containing the liquid tar-acids and a residue of carbolic acid dissolved in them; thirdly, to effect complete purification of the more or less hydrated carbolic-acid crystals thus obtained by recrystallization, either by partial fusion or solution in water with subsequent refrigeration; and, lastly, to prepare carbolic acid of high or complete degrees of purity by dehydrating the partially or wholly purified more or less hydrated carbolic-acid crystals above mentioned.

The method by which we attain the object of this invention is as follows: We take the said mixtures of carbolic, cresylic, and other tar-acids, (capable, when dehydrated, of crystallizing between 62° Fahrenheit and 95° Fahrenheit,) and, having previously ascertained that they are either wholly or partially hydrated—that is, combined with water in proportions varying from five to thirty parts of water, by volume, to one hundred parts mixed acids, or if in a state of dehydration—we effect an amount of hydration by the addition of water equivalent to one or some other of these proportions, and we place the said hydrated mixed acids in suitable vessels surrounded by a cooling mixture or circulating fluid of temperature sufficiently low (that is, varying between 15° Fahrenheit and 56° Fahrenheit) to effect the separation of more or less hydrated carbolic-acid crystals. This refrigerating process being complete, the mother-liquors are drained or otherwise separated from the crystals of more or less hydrated carbolic acid and rectified in the usual manner, well known to manufacturers, to bring them within the limits of the crystallizable temperatures (namely, 62° Fahrenheit to 95° Fahrenheit) above mentioned as suitable for retreatment in the manner herein described. The more or less hydrated carbolic-acid crystals separated from the mother-liquors above mentioned, if required, we purify from all trace of the latter by recrystallization, either by partial fusion or from solution in water and subsequent refrigeration of the water solution to a temperature of about 33° Fahrenheit. The more or less hydrated carbolic-acid crystals, whether partially or completely purified, obtained as above, we dehydrate by fractional distillation, and thus obtain carbolic acid crystallizing at or between 100° Fahrenheit and 108°.5 Fahrenheit, and boiling with thermometer in liquor at or between 358° and 360° Fahrenheit, at an atmospheric pressure of 29.26.

From the foregoing description it will be seen that the merits of our invention rest upon the fact that when dehydrated the mixed tar-acids crystallize indiscriminately and inseparably at between 62° and 95° Fahrenheit, but when hydrated a refrigeration of from 15° to 56° Fahrenheit only crystallizes the pure carbolic acid, leaving the other hydrated acids in a liquid form.

Having thus stated the nature and particulars of our invention, we wish it to be understood that we do not intend to limit ourselves to the precise details given, as they may be varied or modified, and that what we claim herein as new, and desire to secure by Letters Patent of the United States, is—

The process of manufacture and separation of carbolic acid of qualities crystallizing at or between 100° and 108°.5 Fahrenheit, and boiling at 358° to 360° Fahrenheit from mixtures of carbolic, cresylic, and other tar-acids capable of crystallizing when dehydrated between 62° and 95° Fahrenheit, by submitting the said mixed carbolic, cresylic, and other tar-acids in a state of partial or complete hydration to the successive steps of refrigeration, crystallization, and dehydration, substantially as herein described.

In testimony whereof we have hereunto set our hands before two subscribing witnesses.

CHAS. LOWE.
JNO. GILL.

Witnesses:
H. B. BARLOW, *Manchester*.
I. W. APPLEBY, *Manchester*.